Aug. 30, 1927.
F. R. PARKER
1,640,516
ELECTRICAL PROTECTIVE APPARATUS
Original Filed June 1, 1915
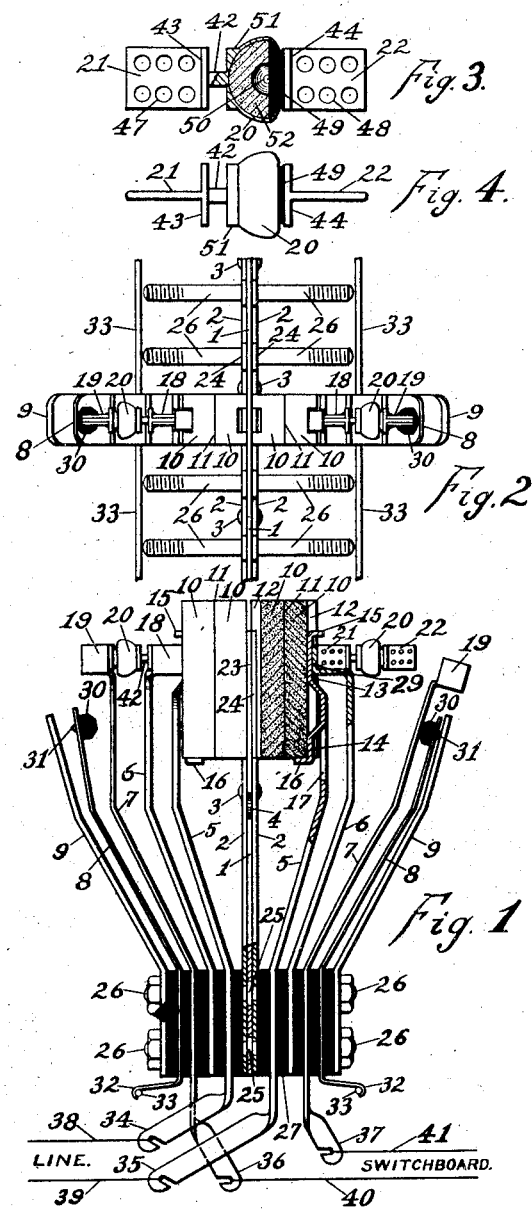
INVENTOR:
Frederick R. Parker.

Patented Aug. 30, 1927.

1,640,516

UNITED STATES PATENT OFFICE.

FREDERICK R. PARKER, OF CHICAGO, ILLINOIS.

ELECTRICAL PROTECTIVE APPARATUS.

Original application filed June 1, 1915, Serial No. 31,487. Divided and this application filed February 3, 1922. Serial No. 533,739.

This application is a division of my United States patent application Serial No. 31,487, filed June 1, 1915, on electrical protective apparatus, which was renewed on June 17, 1921, under Serial No. 478,457 and which has matured into Patent 1,405,935, issued Feb. 7, 1922.

My invention relates to apparatus for protecting electrical circuits and apparatus from injury from electricity in various forms, the construction illustrated in the accompanying drawings being particularly adapted for what is known as telephone switchboard protectors, although the invention may be used in connection with other systems and apparatus and in various places.

An object of my invention is to provide improved electrical protective apparatus, and improved features in such apparatus, substantially as herein set forth.

Another object of my invention is to provide a plurality of thermally-releasable circuit-controlling devices in a protector device, preferably in the form of soldered or cemented connections, one of which is under the control of a resistance heater and another of which is under the control of a high-potential electricity arrester or spark-gap electricity arrester.

Still another object of my invention is to provide an improved, simple and efficient heat-cartridge or resistance heater device for electrical protective apparatus or for other uses.

A further object of my invention is to provide improved means for retaining the solder or cementing material of the thermally-releasable soldered or cemented connections of the apparatus, upon the operation thereof, for use in resoldering or recementing the said connections repeatedly after operation.

A still further object of my invention is to provide an improved high-potential electricity arrester or spark-gap electricity arrester for electrical protective apparatus.

Another object of my invention is to provide an improved dielectric member or separator for high-potential electricity arresters or spark-gap electricity arresters.

Still another object of my invention is to provide improved thermally-operable switches in electrical protective apparatus.

A further object of my invention is to provide improved testing contacts in electrical protective apparatus.

A still further object of my invention is to provide improved alarm-circuit wiring and alarm-spring terminals for the apparatus, arranged and co-operating with each other so that the protector springs may be readily dismounted from or mounted onto the mounting plate without interference from said wiring.

Another object of my invention is to provide improved means for automatically indicating what form of electricity the operation of the apparatus was caused by.

Still another object of my invention is to provide improved arrangements of the various parts of the apparatus, giving greater accessibilitly, serviceability, etc.

Other objects will be apparent from the following specification.

In the accompanying drawings, illustrating one preferred form of my invention, Figure 1 is a plan view of a vertical strip of protective devices of the invention, with portions shown in section, showing a pair of protectors or duplicate sets of the protective apparatus mounted on opposite sides of a ground or mounting plate, the apparatus on the left-hand side of the mounting plate being in set position ready for operation and the apparatus on the right-hand side of the mounting plate being in an operated position; Fig. 2 is a front elevation of a pair of protectors or duplicate sets of the protective apparatus of Fig. 1, mounted on opposite sides of a ground or mounting plate; Fig. 3 is a plan view of one of the heat-cartridges or resistance heaters of Fig. 1, the body of the device being shown in section to show the interior construction thereof; and Fig. 4 is a side elevation of the heat-cartridge or resistance heater device of Fig. 3.

Like characters refer to like parts in the several figures.

The form of the invention illustrated in the accompanying drawings will now be described in detail as follows:

The ground plate or mounting plate preferably comprises three thin flat metal plates 1 2 2 placed together broadsidedly, although I may use other forms of ground or mounting plates with the protective apparatus of this invention. The mounting plate 1 2 2 illustrated, forms the subject matter of my co-pending United States patent application Serial No. 478,457, on mounting plate for electrical protective apparatus, above mentioned. Double-ended bolts 26 26 extend through the mounting plate 2 1 2 preferably as shown and are used for mounting the protective apparatus onto opposite sides of the mounting plate preferably as shown. The plates 2 1 2 of the mounting plate are preferably held together by rivets 3 and by the apparatus mounted on bolts 26 26. Each of the bolts 26 26 has a shoulder portion or projection portion 25 thereon at the middle thereof, which portion 25 is preferably square but which may be made in other forms. The middle plate 1 of the mounting plate is provided with holes therethrough for accommodating the portions 25 25 on the bolts 26 26, these holes in the middle plate 1 being preferably square, although they may be made in any shape and size to accommodate and fit the projecting portions 25 25 on the bolts 26 26. The portions 25 25 fitting in the holes in the middle plate 1, hold the bolts 26 26 from turning, and the plates 2 2 bearing against the projecting portions 25 25 on the bolts 26 26 hold these bolts from moving endwise in either direction. This permits the sets of protective apparatus on opposite sides of the mounting plate to be mounted onto opposite ends of the bolts 26 26 separately. The portions 25 25 on the bolts 26 26 are preferably slightly thicker than the middle plate 1, so that the plates 2 2 will bear tightly against the portions 25 25 and thereby make good electrical connection between the bolts 26 26 and the mounting plate or ground plate 2 1 2. The mounting bolts 26 26 and their co-operation with the mounting plate 2 1 2 are covered in my above-mentioned co-pending application Serial No. 478,457, on mounting plate for electrical protective apparatus.

The outer plates 2 2 of the mounting plate are provided with tongue portions 24 24 along the front edge of the mounting plate, over which tongue portions the inner electrodes 10 10 of the high-potential electricity arresters 10 11 10 10 11 10 are placed as shown, the grooves 12 12 in the inner electrodes 10 10 accommodating the tongue portions 24 24 so that the electrodes 10 10 preferably rest against the middle plate 1 on opposite sides thereof. The tongue portions 24 24 prevent lateral displacement of the inner electrodes 10 10 of the high-potential electricity arresters. This feature is covered in my above-mentioned co-pending application Serial No. 478,457, on mounting plate for electrical protective apparatus. The edge portions of the plates 2 2 between the tongue portions 24 24 may form stops to limit the insertion of the inner electrodes 10 10 of the high-potential electricity arresters into the apparatus.

Spring members 5 6 7 8 9, on each side of the mounting plate 2 1 2, constitute a set. Such sets of spring members are mounted in rows along opposite sides of the mounting plate 2 1 2, on bolts 26 26 preferably as shown, the springs of each set being insulated from each other by insulating members 27 27 and insulating bushings around the bolts 26 26 (not shown). The members 9 9 are preferably stiff enough to have very little spring in them as utilized, the nuts on the bolts 26 26 electrically connecting the members 9 9 with the bolts 26 26 which bolts are electrically connected with the mounting plate 2 1 2 as hereinbefore set forth. Springs 5 5 and 6 6 are preferably heavier springs than springs 7 7, and springs 8 8 are preferably considerably lighter than springs 7 7. All of the springs are preferably punched out of sheet German-silver. Two sets of the springs directly opposite each other on opposite sides of the ground plate 2 1 2 constitute a pair, and each pair of sets of the protective apparatus is intended to be connected with a metallic line, in systems where metallic lines are used, such as telephone systems, although they may be connected otherwise if desired. Springs 5 5 of a pair of sets of the protective apparatus are provided with respective line terminals 34 35 to which the line wires 38 39 are connected, respectively. The wires 38 and 39 may constitute a metallic line or they may be two grounded-return or common-return lines. Springs 7 7 of a pair of sets of the protective apparatus are provided with respective switchboard terminals 36 37 to which the switchboard wires 40 41 are connected, respectively. The wires 40 and 41 may constitute a metallic circuit or they may be two grounded-return or common-return circuits. Springs 8 8 are used for closing an alarm circuit when the apparatus operates, to control an alarm to indicate that the apparatus has operated, and each spring 8 is provided with a terminal 32 bent preferably as shown. All of the alarm terminals 32 32 along each side of the mounting plate 2 1 2 are preferably soldered to a heavy wire 33 which preferably extends along each side of the mounting plate. The wires 33 33, on opposite sides of the mounting plate, are located far enough out from and away from the mounting plate 2 1 2 and the ends of the bolts 26 26 so as not to interfere with dismounting the spring members 5 6 7 8 9 from the bolts 26 26, or remounting said spring members onto the bolts 26 26, when the terminals 32 32 of the sets of springs to be dismounted or remounted are unsoldered from the common wire 33. The terminals 32 32 of the springs 8 8 reach out over the wires 33 33, instead of extending under them, which greatly facilitates the dismounting or remounting of the springs 8 8. The wire 33 33 on opposite sides of the mounting plate 2 1 2, are preferably electrically connected with each other at an end of the mounting plate 2 1 2, so as to electrically connect all of the alarm springs 8 8 on both sides of the mounting plate 2 1 2 together. Likewise, all of the contact members 9 9 on both sides of the mounting plate 2 1 2 are electrically connected together, through the mounting plate 2 1 2 by means of the bolts 26 26. Thus a suitable alarm device in circuit with a battery may be connected from the wire 33 to the mounting plate 2 1 2 so as to have its circuit closed and be operated by any one of the alarm springs 8 8 on either side of the mounting plate 2 1 2 coming into contact with its corresponding contact member 9, as is the case when a protector device of the apparatus operates, as will be hereinafter described. The alarm springs 8 8 preferably carry respective insulators 30 30, when it is not desired to ground the springs 7 7 upon the operation of the apparatus. In smaller installations where the alarm is not required in connection with the protective apparatus, the springs 8 8 with their insulators 30 30, the contact members 9 9, and the conductors 33 33, may be left off of the apparatus; it being easy to add these parts to the apparatus if the alarm is required later.

Each high-potential electricity arrester 10 11 10 is inserted between the free end of a line spring 5 and the ground plate 2 1 2 which is connected to earth, the tongue portions 13 and 14 on the spring member 5, bearing against the outer electrode 10 of the arrester, due to the spring tension in spring member 5, preferably in a groove 12 in the outer electrode 10, so as to hold the arrester firmly against the ground plate and at the same time prevent lateral displacement of the outer electrode 10. The tongue portions 13 and 14 bear against the outer electrode 10 independently of each other so as to hold the electrodes 10 10 firmly against the dielectric member 11 along their entire length. The end 16 of the tongue portion 14 of the spring member 5 is preferably turned inwardly or toward the ground plate 2 1 2, to form a stop for limiting the insertion of the outer electrode 10 into the apparatus. The construction of the portions 13 14 and 16 of the spring members 5 5 is described and claimed in my United States Letters Patent No. 1,179,380, dated April 11, 1916, on high-potential electricity arrester. For the electrodes 10 10 I may use metallically-plated carbon blocks as described and claimed in my said United States Letters Patent No. 1,179,380, dated April 11, 1916, on high-potential electricity arrester. For the dielectric member 11 I may use a piece of celluloid or other heat-susceptible material adapted to permit the discharge of electricity thereacross from one electrode 10 to the other to take place through air, as described and claimed in the United States Letters Patent No. 1,110,259, dated Sept. 8, 1914, on electric line apparatus protector. However, a form of high-potential electricty arrester which I desire to incorporate in this invention, preferably comprises carbon or other disintegrable electrodes 10 10, a dielectric member 11 of celluloid or other suitable insulating material, interposed between the electrodes 10 10, and metal foil on opposite sides of the dielectric member 11 adjacent the discharge surfaces of the disintegrable electrodes 10 10. This dielectric member 11 is preferably provided with a large number of small holes or recesses therein to permit the discharge of electricity thereacross to take place through air and to scatter the discharge through the arrester and thus lessen its force at any one point. Scattering the discharge in this manner protects the metal foil and the surfaces of the electrodes from injurious effects of heavy concentrated discharges. The metal foil, such as tin foil or other foils or thin metal coverings, may be applied, pasted or cemented to the opposite sides of the dielectric member 11 in any suitable manner, care being taken that the edges of the foil on the opposite sides of the dieslectric member do not come into contact with each other at the edges of the dielectric member. When the metallized dielectric member 11 is interposed between the electrodes 10 10 of the arrester, the thin metal foil or covering is held against the active or discharge surfaces of the electrodes 10 10, which prevents particles of disintegration from said active or discharge surfaces of the electrodes 10 10 from entering the holes or recesses in the dielectric member 11 and thereby prevents such particles from forming a leakage or short-circuit through the arrester. Where celluloid or other heat-softenable or heat-susceptible material is used as the dielectric member 11, a continued arc through the arrester will heat the dielectric member sufficiently to soften it or change it in such a way so as to permit the spring member 5 to press the outer electrode 10 into conductive connection with the inner electrode 10 and thereby stop the arc and the heating caused thereby. The metal foil or covering on opposite sides of the dielectric member may also be considered to be electrodes for the arrester, the carbons or other conductive portions 10 10 bearing thereagainst being means for conducting the high-potential electricity to the metal foil or covering.

Each heat-cartridge or resistance heater device, shown in detail in Figs. 3 and 4, is soldered or cemented to the free ends of a pair of spring members 6 7 of a set of the protector springs, preferably as shown in Fig. 1, by easily-fusible metallic solder or cementing material. The portion 29 of the spring 6, at the outer end of the portion 21 of the heat-cartridge 20, bears against the line spring 5 preferably as shown in Fig. 1, due to the spring tension in spring 6, so as to provide an openable contact for testing purposes. The spring 6 is provided with a pair of ear-portions 18 18 turned up from opposite edges of the spring, between which portions 18 18 the flat portion 21 of the heat-cartridge is soldered or cemented. The portions 18 18 are far enough apart so that the portion 21 may readily slip from between them when the solder or cementing material at 21 is softened by abnormal heating. The spring 7 is provided with a pair of ear-portions 19 19 turned up from opposite edges of the spring, between which portions 19 19 the flat portion 22 of the heat-cartridge is soldered or cemented. The portions 19 19 are far enough apart so that the portion 22 may readily slip from between them when the solder or cementing material at 22 is softened by abnormal heating. Excessive heating in the arrester 10 11 10, due to a continued discharge therethrough or to a heavy discharge of short duration, heats the solder or cementing material at 21, on account of the portions 13 and 29 being so closely associated with the arrester 10 11 10, and when this solder or cementing material at 21 becomes softened by such heating, the spring member 7, which has a tension tending to throw it away from the ground plate 2 1 2 as shown on the right-hand side of Fig. 1, pulls the heat-cartridge 20 away from the spring member 6 and thereby opens the circuit between the heat-cartridge 20 and the spring member 6 which cuts the switchboard conductor 40 or 41 from the corresponding line conductor 38 or 39. The excessive high-voltage current which causes the excessive heating in the arrester 10 11 10, which current may be a stroke of lightning, an electric light current, a street-car current, etc., comes from a line wire 38 or 39 and passes through a line spring 5 and an arrester 10 11 10 to the grounded plate 2 1 2 in a manner well understood. Excessive heating in the resistance heater or heat-cartridge 20, due to a low-voltage current therein in excess of the normal, which current is generally termed a sneak-current, or to a high-voltage current which may in some instances pass through the resistance heater 20, which current generally comes from a line conductor 38 or 39 and passes through a line spring 5, the resistance heater 20, the corresponding switchboard spring 7 and the switchboard conductor 40 or 41, heats the solder or cementing material at 22, and when this solder or cementing material at 22 becomes softened by such heating, the spring member 7, due to the aforesaid tension therein, separates itself from the heat-cartridge 20 and thereby opens the circuit between itself and the heat-cartridge 20 which cuts the switchboard conductor 40 or 41 from the corresponding line conductor 38 or 39. In every instance when a switchboard spring 7 operates, either from excessive heating in an arrester 10 11 10 or from excessive heating in a heat-cartridge 20, the circuit and apparatus connected therewith is cut off from the line and thus protected from injury from the injurious current in the line. If this injurious current is of low voltage, say less than 500 volts, it will not flow to ground through the protective apparatus and probably unnecessarily blow a fuse somewhere on the line, because there is in this case no ground for the current established by the protective apparatus. However, if the injurious current is of high voltage, say of 500 volts or more, it will arc across the dielectric 11 of the arrester 10 11 10 and pass off to ground through the ground plate 2 1 2 in a manner well understood. If this flow of current through the arrester 10 11 10 continues, the softenable dielectric 11 will soon become softened by the heat of the arc whereupon the spring 5 will press the outer electrode 10 into conductive connection with the inner electrode 10 of the arrester and thereby stop the arc and the heating thereof and at the same time establish a ground connection for the injurious current. In this case the increased flow of the injurious current through the established ground connection may be sufficient to blow a line fuse on the line which will stop the flow of the injurious current to the protective apparatus. When both of the springs 7 7 of a pair of sets of the protective apparatus operate, both of the switchboard conductors 40 and 41 of a metallic line will be cut off from both of the line conductors 38 and 39 of the metallic line. When a switchboard spring 7 operates, it bears against an insulating portion 30 carried by an alarm spring 8, and in so doing presses the alarm spring 8 into contact with the corresponding contact member 9 and thereby closes an alarm circuit as hereinbefore set forth, to sound an alarm or give a visual signal, or both, as an indication that a protective device has operated. The insulating members 30 30 are carried by the springs 8 8 and not by the springs 7 7, so that when the alarm springs 8 8 are not required and are removed from the apparatus the members 30 30 will not remain in the apparatus as they would if attached to the springs 7 7. The flat portions 21 and 22 of each heat-cartridge 20 are preferably arranged to lie in the plane of operation of their spring 7, as shown in Fig. 1, so that the soldered joints or switches at 21 and 22 will operate similar to knife switches and not bind as they might if arranged in other positions. The holes 47 and 48 in the portions 21 and 22 of the heat-cartridge devices 20 20 are filled with the soft solder or cementing material which is used to solder or cement the cartridges 20 20 to the pairs of spring members 6 7 6 7 of the apparatus, and are for the purpose of holding or retaining the solder or cementing material when the apparatus operates and thus acting as reservoirs to retain the solder or cementing material for resoldering or resecuring the openable soldered or cemented joints in closed position repeatedly after operation for subsequent operations. The resoldering of the joints 18 21 and 19 22 may be done in any suitable manner. By thus retaining the solder or cementing material I am able to resolder or recement the openable joints at 21 and 22 a great many more times than where the holes 47 and 48 are not provided. The small neck portion 42 provided in each heat-cartridge device 20, is for the purpose of preventing the heat from the high-potential electricity arrester 10 11 10 from being conducted to the openable joint at 22 to any appreciable extent, and the heat from the heat-cartridge or resistance heater 20 from being conducted to the openable joint at 21 to any appreciable extent. This construction makes excessive heating in the heat-cartridge or resistance heater 20 always open the soldered or cemented joint at 22 and not at 21, and excessive heating in the arrester 10 11 10 always open the soldered or cemented joint at 21 and not at 22. This method of operation of the apparatus therefore serves as an automatic indicator to indicate what kind of an injurious current was present on the line and caused the operation of the apparatus; for if the joint at 22 opens it shows that a sneak-current caused the operation of the apparatus, while if the joint at 21 opens it shows that a high-voltage current caused the operation of the apparatus. This is important in facilitating the clearing of trouble, in advising the attendant whether or not a dangerous current of high-voltage is to be contended with in resetting the apparatus and testing the line, and in other respects. This construction also makes the resistance heater 20 more sensitive and utilizes the heat more efficiently for causing the operation of the apparatus; which enables me to reduce the resistance of the resistance heater 20.

The resistance heater of the heat-cartridge 20 preferably comprises suitable comminuted resistance material 52 placed between an exterior hemispherical cup-shaped portion 20 and an interior hemispherical portion 50, the edge of the portion 20 being turned over the edge of the insulated portion 49 which is preferably a part of the portion 50, so as to hold the material 52 in the proper degree of compression to give the required resistance for the heater. The portion 20 is preferably a part of the metallic terminal member 21, and the portions 49 and 50 are preferably parts of the metallic terminal member 22. The portion 49 is preferably covered with a non-inflammable insulating enamel or varnish to insulate it from the portion 20 as shown in Figs. 3 and 4, the insulating enamel or varnish preferably covering the inner end of the portion 49 down to the hemispherical portion 50 so as to prevent the portion 49 from short-circuiting the resistance material 52. With the hemispherical portions 20 50, the distance from one of these parts to the other, through the resistance material 52, is the same at all points, and consequently the heating due to a current of electricity passing through the resistance material 52 from one of the portions 20 50 to the other, is uniformly distributed over the portion 50. Furthermore, this construction of the heater concentrates the heat around the portion 50 where it is needed to soften the heat-susceptible material at 22, on account of the hemispherical cross-section of the material 52, taken so that the flow of current is normal thereto, becoming less and less as it approaches the portion 50 and consequently the resistance of the material 52 becoming greater and greater as the portion 50 is approached. As the heat is thus concentrated around the portion 50, there is but little heat radiated from the exterior of the portion 20 and lost. This construction of my resistance heater therefore enables me to still further reduce the resistance of the heating element 52 and at the same time provide sufficient heat for operating the apparatus; on account of utilizing the heat so efficiently. It can also be seen that this construction provides a very simple heat-cartridge, one which is composed of but two metal parts and resistance material therebetween. As the small neck portion 42 makes the resistance heater 20 always unsolder or uncement the openable joint at 22, and the arrester 10 11 10 always unsolder or uncement the openable joint at 21, there are thus two thermally-releasable circuit-controlling devices provided in each set of the protective apparatus, and they are controlled, respectively, by two different types of protective devices.

In the improved apparatus of this invention, the high-potential electricity arresters 10 11 10 10 11 10, the heat-cartridges 20 20, and the alarm contacts 9 31 9 31, are all located to the front of the apparatus in plain view from in front of the mounting plate 2 1 2. This arrangement of the parts is of great advantage in the maintenance of the apparatus and in locating and clearing trouble. With this construction, a new heat-cartridge 20 may be inserted into the apparatus from directly in front of the bank or strip of protectors, the portions 21 and 22 of the cartridge 20 being soldered or cemented to the portions 18 18 and 19 19, respectively, of the respective spring members 6 and 7, in any suitable manner.

After utilizing a suitable test plug or plugs (not shown) in connection with the openable testing contacts 13 29 13 29 of the protective apparatus for testing the protective apparatus and the various circuits extending therethrough, in a manner thought to be well understood, which testing contacts 13 29 13 29 are preferably maintained in open position by the test plug or plugs during such testing, the test plug or plugs are simply removed from the protective apparatus, in a manner well understood, whereupon the spring members 6 6 re-engage the respective spring members 5 5, due to the tension in spring members 6 6 being stronger than the tension spring members 7 7 and acting to move the spring members 6 7 6 7 with their respective heat-cartridges 20 20 toward the mounting plate 2 1 2. The spring members 6 6 re-engaging the spring members 5 5 in this manner, reset the heat-cartridges 20 20 in the respective circuits 38 40 and 39 41 for subsequent operations.

I desire it to be understood that various means and devices adapted to co-operate with the openable testing contacts 13 29 13 29 or with the protective apparatus for testing purposes, are contemplated in this invention.

I also desire it to be understood that the various features of this invention may in some instances be used singly and in other instances collectively, without departing from the scope of the appended claims, and that all such usages are contemplated herein.

I further desire it to be understood that I do not wish to limit this invention nor the various parts thereof to the precise details of construction herein set forth, as many modifications thereof may be made or utilized without departing from the scope of the appended claims.

What I claim herein as my invention is:

1. A heat-cartridge comprising a resistance heater and a plurality of thermal portions one of which is under control of the said heater, and means for preventing the free passage of heat from the said heater to another of the said thermal portions.

2. A heat-cartridge comprising a resistance heater and a plurality of thermal portions one of which is under control of the said heater, and means for preventing the free passage of heat between the said thermal portions.

3. An electrical protector having operable circuit-controlling mechanism, a plurality of serially-arranged openable soldered joints normally restraining the said circuit-controlling mechanism from operating and operable thereby upon abnormal heating, a resistance heater, excessive heating in which heats one of the soldered joints sufficiently to permit the said circuit-controlling mechanism to operate and open this soldered joint, a high-potential electricity arrester, excessive heating in which heats another of the soldered joints sufficiently to permit the said circuit-controlling mechanism to operate and open this soldered joint, and means for compelling the said resistance heater and arrester to heat only their respective soldered joints for causing the operation of the said mechanism.

4. An electrical protector having operable circuit-controlling mechanism, a plurality of serially-arranged openable soldered joints normally restraining the said circuit-controlling mechanism from operating and operable thereby upon abnormal heating, a resistance heater, excessive heating in which heats one of the soldered joints sufficiently to permit the said circuit-controlling mechanism to operate and open this soldered joint, and a high-potential electricity arrester, excessive heating in which heats another of the soldered joints sufficiently to permit the said circuit-controlling mechanism to operate and open this soldered joint.

5. An electrical protector having an operable circuit-controlling member, a plurality of serially arranged thermally-releasable devices controlling the said circuit-controlling member and operable thereby upon abnormal heating, a resistance heater and a high-potential electricity arrester arranged to heat the respective thermally-releasable devices to cause the operation of the said circuit-controlling member, and means for compelling the said resistance heater and arrester to heat only their respective thermally releasable devices for causing the operation of the said circuit-controlling member.

6. An electrical protector having an operable circuit-controlling member, a plurality of serially-arranged thermally-releasable devices controlling the said circuit-controlling member and operable thereby upon abnormal heating, and a resistance heater and a high-potential electricity arrester arranged to heat the respective thermally-releasable devices to cause the operation of the said circuit-controlling member.

7. An electrical protector having an operable circuit-controlling member, a plurality of serially arranged thermally-releasable devices controlling the said circuit-controlling member and operable thereby upon abnormal heating, a plurality of protective devices of different characters arranged to heat the respective thermally-releasable devices to cause the operation of the said circuit-controlling member, and means for compelling the said protective devices to heat only their respective thermally-releasable devices for causing the operation of the said circuit-controlling member.

8. An electrical protector having an operable circuit-controlling member, a plurality of serially-arranged thermally-releasable devices controlling the said circuit-controlling member and operable thereby upon abnormal heating, and a plurality of protective devices of different characters arranged to heat the respective thermally-releasable devices to cause the operation of the said circuit-controlling member.

9. An electrical protector having an operable circuit-controlling member, a plurality of serially-arranged thermally-releasable devices controlling the said circuit-controlling member and operable thereby upon abnormal heating, means for heating the said thermally-releasable devices separately whereby each may cause the operation of the said circuit-controlling member, and means for preventing the free passage of heat from one thermally-releasable device to another.

10. An electrical protector having an operable circuit-controlling member, a plurality of serially-arranged thermally-releasable devices controlling the said circuit-controlling member and operable thereby upon abnormal heating, and means for heating the said thermally-releasable devices separately whereby each may cause the operation of the said circuit-controlling member.

11. In an electrical protector comprising a sneak-current resistance heater and a high-potential electricity arrester, a thermally-releasable device under control of the said resistance heater and serving when operated to indicate that the apparatus was operated by a sneak-current, another thermally-releasable device under control of excessive heating in the said arrester and serving when operated to indicate that the apparatus was operated by high-potential electricity, and common operating means for operating the said thermally-releasable devices when heated.

12. In an electrical protector comprising a plurality of protective devices of different characters, a plurality of thermally-releasable devices under control of the respective protective devices and serving when operated to indicate the operation of the apparatus through the agency of the respective protective devices, and common operating means for operating the said thermally-releasable devices when heated.

13. In an electrical protector comprising a plurality of protective devices of different characters, a plurality of operable devices under control of the respective protective devices and serving when operated to indicate the operation of the apparatus through the agency of the respective protective devices, and common operating means for operating the said operable devices upon abnormal electrical conditions in the respective protective devices.

14. In an electrical protector, a plurality of operable devices serving when operated to indicate the operation of the apparatus by electricity of high or low potentials, respectively, and common operating means for operating the said operable devices upon abnormal electrical conditions.

15. In apparatus of the character set forth having an openable thermally-controlled switch comprising a plurality of switch members normally secured together by solder, at least one of the said switch members having one or more holes therein containing some of the solder and retaining same when the switch is opened, for use in resoldering the switch in closed position when reheated.

16. In electrical apparatus having an openable thermally-controlled switch comprising a plurality of switch members normally held in electrical connection with each other by heat-softenable material, at least one of the said switch members having one or more cavities therein containing some of the heat-softenable material and retaining same when the switch is opened for use in resecuring the switch in closed position when reheated.

17. In apparatus having an openable thermally-controlled soldered joint, at least one of the joined members having one or more cavities therein containing some of the solder and retaining same when the joint is opened, for use in resoldering the joint in closed position when reheated.

18. In apparatus having an openable thermally-controlled connection comprising a plurality of members normally secured together by heat-softenable material, at least one of the said member having one or more cavities therein containing some of the heat-softenable material and retaining same when the said connection is opened, for use in resecuring the said connection in closed position when reheated.

19. In electrical protective apparatus of the character set forth having an openable spring member, a plurality of serially-arranged thermally-releasable knife switches normally controlling the said spring member and operable thereby upon abnormal heating, and means for heating each of the said knife switches, the heating of either of the latter permitting the said spring member to operate and thereby operate the heated switch, the said knife switches being operable in the plane of operation of the said spring member.

20. In electrical protective apparatus of the character set forth having an operable spring member, a thermally-releasable knife switch normally controlling the said spring member and operable thereby upon abnormal heating, and means for heating the said knife switch to permit the said spring member to operate and thereby operate the said knife switch, the said knife switch being operable in the plane of operation of the said spring member.

21. In electrical protective apparatus of the character set forth, an operable spring member, and a thermally-releasable knife switch normally controlling the said spring member and operable thereby upon abnormal heating, the said knife switch being operable in the plane of operation of the said spring member.

As inventor of the foregoing I hereunto subscribe my name this 1st day of February, 1922.

FREDERICK R. PARKER.